United States Patent
Ferri et al.

[15] 3,639,932
[45] Feb. 8, 1972

[54] RARE EARTH OXIDE PHOSPHOR HAVING A CONTROLLED DECAY TIME

[72] Inventors: John L. Ferri, Towanda; James E. Mathers, Ulster, both of Pa.

[73] Assignee: Sylvania Electric Products Inc.

[22] Filed: Nov. 13, 1970

[21] Appl. No.: 89,473

[52] U.S. Cl. .................................................252/301.4 R
[51] Int. Cl. .........................................................C09k 1/10
[58] Field of Search .........................................252/301.4 R

[56] References Cited

UNITED STATES PATENTS 3,322,682   5/1967   Thompson ......................252/301.4 R Primary Examiner—Robert D. Edmonds
Attorney—Norman J. O'Malley, Donald R. Castle and William H. McNeill

[57] ABSTRACT

A cathodoluminescent phosphor composition with a controlled decay time is disclosed wherein the phosphor consists of a matrix of $Y_2O_3$ contaminated with dysprosium, and a dopant of europium and a predetermined amount of at least one of terbium and praeseodymium. A process for controlling the decay time is also disclosed.

8 Claims, No Drawings

RARE EARTH OXIDE PHOSPHOR HAVING A CONTROLLED DECAY TIME

CROSS-REFERENCE TO RELATED APPLICATION

Copending U.S. Pat. application Ser. No. 89,452, filed concurrently herewith, discloses a luminescent phosphor composition consisting of a yttrium oxide matrix and a dopant of europium and up to about 100 p.p.m. dysprosium and a process for preparing such a phosphor. The foregoing copending patent application is assigned to the same assignee as the present invention.

BACKGROUND OF THE INVENTION

1. Field of the Invention

This invention relates to a phosphor composition. More particularly, it relates to a yttrium oxide phosphor with a controlled decay time.

2. Prior Art

With the advent of color television, a whole new series of phosphors were necessary. Zinc cadmium sulfide was the red-emitting phosphor that was normally used. However, because of its high cadmium content, the phosphor has an objectionable yellow-orange body color, which imparts a noticeable yellowish off white appearance to the screen as a whole. Another shortcoming of the red-emitting zinc cadmium sulfide phosphor is its insufficient luminous efficiency relative to the green-emitting and blue-emitting phosphors. This made the red-emitting phosphor the limiting factor in developing a color screen combination of desired brightness.

With the discovery of the rare earth phosphor systems, especially europium-activated yttrium oxide, the previous problems, that is, body color and brightness were overcome. As with anything new, however, the new rare earth phosphors also presented their own unique problems. One of these problems is purity. Rare earths are usually found combined with other rare earths. If yttrium oxide was to be used as a phosphor matrix, the television industry had to know how pure the starting material had to be and what impurities could be tolerated.

Much has appeared in the literature and patents concerning the rare-earth phosphor systems, their required purities and ways for purifying the rare earths. Ropp recites $Y_2O_3$ phosphors activated by samarium, europium, gadolinium, terbium, and dysprosium, respectively, with europium-activated $Y_2O_3$ being the superior phosphor. Wickersheim and Lefever avoid using yttrium oxide containing dysprosium because they state it reduces the fluorescent intensity. Thompson, in U.S. Pat. No. 3,322,682, uses terbium with europium or praseodymium with europium as an activator for $Y_2O_3$ phosphor system. The terbium and praseodymium are present from 10 to 1,000 p.p.m. and produce a phosphor having a brilliant luminescence when exhibited under cathode-ray excitation.

Very little has been done to enable the phosphor manufacturer to use rare earths containing known detrimental elements. The rare earths must be purified using costly steps or they must be scrapped. One such example is yttrium oxide that contains dysprosium. In certain cases, as for example copending U.S. Pat. application Ser. No. 89,452, it is beneficial to have dysprosium present in yttrium oxide in amounts up to about 100 p.p.m. to control and lengthen the decay time of the finished phosphor. In many applications, however, yttrium oxide containing dysprosium cannot be used because of the lengthened decay time.

It has been found, however, that if up to about 110 p.p.m. of at least one of praseodymium and terbium are added to yttrium oxide containing dysprosium before firing to make a phosphor, the resultant phosphor's decay time is significantly reduced and can be satisfactorily used in cathode-ray screen fabrication.

Prior art taught vast numbers of rare earths could be added. Particular ones are thought to be equivalent, but for the particular purpose herein, only terbium, praseodymium or mixtures thereof are added in amounts of up to about 110 p.p.m., and for this application they are not equivalent to other similar rare earths. Therefore, it is an unexpected improvement over the prior art to obtain the results of this invention, that is, that yttrium oxide containing dysprosium can be used for phosphor preparation and there is obtained a phosphor having an extremely short decay time by adding at least one of praseodymium and terbium prior to the preparation of the phosphor.

SUMMARY OF THE INVENTION

In accordance with one aspect of this invention, there is provided a luminescent phosphor composition. The phosphor composition consists essentially of a yttrium oxide matrix contaminated with minute amounts of dysprosium and a dopant consisting of from about 1 to about 10 weight percent europium and from about 1 p.p.m. to about 110 of terbium, praseodymium or mixtures thereof.

In accordance with another aspect of this invention, there is provided a process for preparing the phosphor composition. The process comprises adding from about 1 to about 110 p.p.m. of at least one of terbium and praseodymium to the phosphor raw materials contaminated with dysprosium prior to firing the raw materials to form the phosphor.

DETAILED DESCRIPTION OF THE PREFERRED EMBODIMENTS

For a better understanding of the present invention, together with other and further objects, advantages, and capabilities thereof, reference is made to the following disclosure and appended claims in connection with the above description of some of the aspects of the invention.

Referring now to the invention with greater particularity, it has been found that when praseodymium, terbium and mixtures thereof are added to yttrium oxide, containing minor amounts of dysprosium as an impurity, that is, from about 1 to about 75 p.p.m. based on the yttrium oxide, prior to firing the phosphor raw materials to form a phosphor, the decay time of the resultant phosphor is significantly reduced.

The phosphor composition consists essentially of a matrix of about 90 to about 99 weight percent yttrium oxide contaminated with from about 1 to about 75 p.p.m. of dysprosium, and a dopant consisting essentially of from about 1 to about 10 percent europium and about 1 to about 110 p.p.m. of terbium, praseodymium and mixtures thereof. Especially preferred is about 95 to about 96 weight percent yttrium oxide and about 5 to about 4 weight percent europium oxide to insure the maximum color purity and brightness. When less than about 90 weight percent yttrium oxide is used, the excessive amounts of europium present can cause a quenching effect and a significant loss in brightness. When greater than about 99 percent yttrium oxide is used, generally not enough europium is present to activate the phosphor. Preferably, the source of yttrium is at least about 99.5 percent pure. The dysprosium content can range from about 1 p.p.m. to about 75 p.p.m. When greater than about 75 p.p.m. dysprosium is present, the brightness of the phosphor can be significantly reduced by the presence of the dysprosium as well as the presence of excessive amounts of terbium or praseodymium needed to reduce the decay time of the phosphor to an acceptable level.

From about 1 to about 110 p.p.m. of a member selected from the group consisting of terbium, praseodymium and mixtures thereof can be incorporated into the phosphor raw materials. Terbium and praseodymium can be used singly or in combination with each other, although it is preferred to use from about 5 to about 55 p.p.m. terbium or from about 5 to about 55 p.p.m. praseodymium. When less than about 1 p.p.m. is used, the decay time of the phosphor is not significantly reduced. When greater than about 110 p.p.m. of either terbium and praseodymium is used, the decay time is further reduced but the brightness of the phosphor is also reduced.

The method of incorporating terbium, praseodymium, or mixtures thereof into the $Y_2O_3$:Eu lattice is accomplished by having the terbium or praseodymium present in the phosphor raw materials at the time of the subsequent conversion of the phosphor raw materials to the desired phosphor. This can be accomplished by coprecipitating yttrium, europium, and at least one of terbium and praseodymium as oxalates, separating the oxalates, such as by filtration, and firing the oxalates under controlled conditions to form the desired oxide phosphor. Another such method is to combine yttrium oxide, europium oxide, and at least one of terbium oxide and praseodymium oxide, and to convert the raw materials to the desired phosphor by the direct firing of the oxides at a temperature of from about 1,100° C. to about 1,300° C. for at least about 2 hours. At least about 2 hours within the aforementioned temperature range is necessary to insure complete conversion of the oxides to the phosphor.

In order to more fully illustrate the preferred embodiments of this invention, the following detailed examples are given. All parts, proportions, and percentages are by weight unless otherwise given.

EXAMPLE 1

In order to evaluate this invention for reducing the decay time of $Y_2O_3$:Eu phosphor, a testing procedure is deviced to simulate the phenomenon as it actually occurs in a display panel or cathode-ray tube. The method of measuring $Y_2O_3$:Eu decay is a semiquantitative technique using a demountable cathode-ray tube with a control grid pulsed by a pulse generator. Buildup and decay of fluorescence are detected by an RCA No. 6217 photomultiplier with its output connected to an oscilloscope. Settled slides of the phosphor samples are mounted in a rotating holder inside the CRT. This enables each sample to be subjected to the same excitation conditions without making any adjustments on the electron gun or yoke.

A defocussed spot is pulsed on the screen at a current density of approximately 0.5 $\mu$amp/cm². At low photomultiplier sensitivity the pulse length is adjusted to give 100 percent buildup (i.e., the curve flattens out at the top). The sensitivity is then increased so that a reference standard reaches a predetermined level (0.05 volts) at 30 milliseconds after cessation of excitation. The samples are then rotated in front of the electron beam without making any gun or photomultiplier adjustments and the relative readings are taken at 30 milliseconds. This procedure is carried out for all the examples.

About 215.68 parts yttrium oxide, contaminated with about 0.00055 parts of dysprosium, about 15.84 parts europium oxide, and about 0.0055 parts terbium oxide are combined as dry powders and heated with a suitable flux material at a temperature of from about 1,110° C. to about 1,300° C. for about 2 hours. The decay time of the resultant phosphor is measured against a similar phosphor containing no terbium. The terbium containing phosphor had a relative decay of about 0.017 vs. a decay of about 0.050 for the phosphor not containing terbium.

EXAMPLE II

About 215.68 parts yttrium oxide, about 0.00055 parts dysprosium, and about 0.0025 parts praseodymium oxide are coprecipitated as oxalates and heated with a suitable flux material at a temperature of from about 1,100° C. to about 1,300° C. for about 2 hours. The decay time of the resultant phosphor is measured against a similar phosphor containing no praseodymium. The praseodymium containing phosphor had a relative decay of about 0.025 vs. a decay of about 0.050 for the phosphor not containing praseodymium.

EXAMPLE III

Phosphors were prepared according to Example I, except the control phosphor contained about 0.0029 parts (29 p.p.m.) dysprosium, the second phosphor contained about .0029 parts (29 p.p.m.) dysprosium and about 0.0025 parts (25 p.p.m.) terbium and the third phosphor contained about 0.0029 parts (29 p.p.m.) dysprosium and about 0.0025 parts (25 p.p.m.) praseodymium.

TABLE I

| $Y_2O_3$:Eu Phosphor | CRT Brightness | Decay,V | Decrease In Decay |
|---|---|---|---|
| 29 p.p.m. Dy (Control) | 99% | 0.360 | – |
| 29 p.p.m. Dy+25 p.p.m. Tb | 99% | 0.250 | 31% |
| 29 p.p.m. Dy+25 p.p.m. Pr | 97% | 0.170 | 53% |

The addition of terbium and praseodymium to phosphor raw materials containing dysprosium as an impurity decreases the decay about 31 percent and about 53 percent respectively with no appreciable loss in brightness.

EXAMPLE IV

Phosphors were prepared according to Example I, except the amount of terbium varied from about 0 to about 50 p.p.m.

TABLE II

| $Y_2O_3$:Eu Phosphor | CRT Brightness | Decay,V | Decrease In Decay |
|---|---|---|---|
| 5 p.p.m. Dy (control) | 98% | 0.050 | – |
| 5 p.p.m. Dy+5 p.p.m. Tb | 102% | .030 | 40% |
| 5 p.p.m. Dy+10 p.p.m. Tb | 102% | 0.025 | 50% |
| 5 p.p.m. Dy+15 p.p.m. Tb | 102% | 0.023 | 54% |
| 5 p.p.m. Dy+ 25 p.p.m. Tb | 102% | 0.020 | 60% |
| 5 p.p.m. Dy+50 p.p.m. Tb | 97% | 0.017 | 66% |

The decrease in decay time is dependent upon the amount of terbium added. The decay time can be decreased up to about 66 percent with no detrimental effect in the brightness of the phosphor.

EXAMPLE V

Phosphors were prepared according to Example IV, except varying amounts of praseodymium were added in place of terbium.

TABLE III

| $Y_2O_3$:Phosphor | CRT Brightness | Decay,V | Decrease In Decay |
|---|---|---|---|
| 5 p.p.m. Dy (control) | 100% | 0.050 | – |
| 5 p.p.m. Dy+5 p.p.m. Pr | 103% | 0.035 | 30% |
| 5 p.p.m. Dy+10 p.p.m. Pr | 100% | 0.035 | 30% |
| 5 p.p.m. Dy+15 p.p.m. Pr | 104% | 0.030 | 40% |
| 5 p.p.m. Dy+25 p.p.m. Pr | 102% | 0.025 | 50% |

The decrease in decay is dependent upon the amount of terbium added. The decay time can be decreased up to about 50 percent with no detrimental effect on the brightness of the phosphor.

Similar experiments were performed, adding both praseodymium and terbium to the phosphor raw materials containing dysprosium, with substantially the same results.

While there has been shown and described what at present are considered the preferred embodiments of the invention, it will be obvious to those skilled in the art that various changes and modifications may be made therein without departing from the scope of the invention as defined by the appended claims.

What is claimed is:

1. A cathodoluminescent phosphor composition having a reduced decay time, consisting essentially of:
   a. a matrix consisting of yttrium oxide contaminated with from about 1 to about 75 p.p.m. of dysprosium and
   b. a dopant consisting of from about 1 to about 10 weight percent europium and from about 1 p.p.m. to about 110 p.p.m. of a rare earth selected from the group consisting of terbium, praseodymium and mixtures thereof.

2. A composition according to claim 1, wherein said dopant consists of from about 1 to about 10 weight percent europium, about 5 to about 55 p.p.m. terbium and about 5 to about 55 p.p.m. praseodymium.

3. A composition according to claim 1, wherein said dopant consists of from about 1 to about 10 weight percent europium, and about 5 to about 55 p.p.m. terbium.

4. A composition according to claim 1, wherein said dopant consists of from about 1 to about 10 weight percent europium, and about 5 to about 55 p.p.m. praseodymium.

5. A process for controlling the decay time of a yttrium oxide phosphor containing from about 1 p.p.m. to about 75 p.p.m. of dysprosium which comprises adding from about 1 to about 110 p.p.m. of a rare earth selected from the group consisting of terbium and praseodymium and mixtures thereof to the phosphor raw materials prior to firing said raw materials to form said phosphor.

6. A process according to claim 5, wherein yttrium, europium and a rare earth selected from the group consisting of terbium and mixtures thereof are coprecipitated as oxalates prior to firing said oxalates to form said oxide phosphor.

7. A process according to claim 5, wherein yttrium oxide, europium oxide, and a rare earth oxide selected from the group consisting of praseodymium oxide and terbium oxide and mixtures thereof are converted to said phosphor by direct firing of said oxides at a temperature range of from about 1,100° C. to about 1,300° C. for at least about 2 hours.

8. A process according to claim 5, wherein said phosphor consists of from about 90 to about 99 weight percent yttrium oxide, from about 1 to about 75 p.p.m. of dysprosium, from about 1 to about 10 weight percent europium, and from about 1 to about 110 p.p.m. of a rare earth selected from the group consisting of praseodymium and mixtures thereof.

* * * * *